Patented Oct. 5, 1948

2,450,646

UNITED STATES PATENT OFFICE 2,450,646

METHOD OF MAKING METHYL HYDROXY-ISOPROPYL KETONE

Robert R. Dreisbach and George Beal Heusted, Midland, Mich., assignors to The Dow Chemical Company, Midland, Mich., a corporation of Delaware No Drawing. Application September 15, 1941, Serial No. 410,894

3 Claims. (Cl. 260—594)

This invention concerns an improved method of making methyl beta-hydroxy-isopropyl ketone, $CH_3COCH(CH_3)CH_2OH$.

It is known that aliphatic ketols, of which methyl hydroxy-isopropyl ketone is an example, may be prepared by reacting formaldehyde with di-alkyl ketones in the presence of aqueous alkalies. Usually by-products such as polyhydroxy ketones, resinous condensation products and tars are formed along with the desired ketol product and the reaction conditions required to obtain the latter in good yield are quite critical and are dependent upon the particular ketol to be formed. The conditions of temperature, proportions, of the reactants and the alkali, the kind of alkali, etc., which favor the formation of a given ketol, e. g., methyl beta-hydroxy-ethyl ketone, in good yield are usually poorly suited to the production of a different ketol, e. g., methyl beta-hydroxy-isopropyl ketone.

The reaction conditions heretofore employed in making methyl beta-hydroxy-isopropyl ketone by such reaction do not permit formation of the compound in good yield. U. S. Patent No. 981,668 discloses the preparation of methyl beta-hydroxy-isopropyl ketone by permitting an aqueous mixture of formaldehyde, methyl ethyl ketone and potassium carbonate to stand, with occasional shaking, for 40 hours and then separating the ketol product. We have tested this method and found that the reaction is far from complete at the close of the stated reaction period, that the yield is low and that by-products are formed in considerable amount. Morgan et al., J. C. S. 135, 2667 (1932), prepared methyl beta-hydroxy-isopropyl ketone by heating a mixture of 108 grams of methyl ethyl ketone, 225 grams of a 40 per cent aqueous formaldehyde solution and 25 cubic centimeters of a 2 normal aqueous sodium hydroxide solution under reflux for 30 minutes and thereafter separating the product. The reaction mixture initially contained 2 moles of formaldehyde and 0.03 mole of sodium hydroxide per mole of methyl ethyl ketone. They obtained from 30 to 40 grams of unreacted methyl ethyl ketone, 35 grams of methyl beta-hydroxy-isopropyl ketone and 34 grams of by-products. The yield of methyl beta-hydroxy-isopropyl ketone was 23 per cent of theoretical, based on the methyl ethyl ketone initially employed and somewhat less than 37 per cent based on the methyl ethyl ketone consumed.

We have found that methyl beta-hydroxy-isopropyl ketone may be produced in considerably higher yield by reacting formaldehyde with methyl ethyl ketone under the following conditions:

(1) The molecular ratio of formaldehyde to methyl ethyl ketone should not greatly exceed 1 and preferably is 0.7 or less.

(2) The reaction mixture should initially contain not more than 0.01 chemical equivalent of alkali per mole of methyl ethyl ketone.

(3) The alkali employed may be an alkali metal hydroxide, e. g. sodium, potassium, or lithium hydroxide, but is advantageously a mixture of such hydroxide and an alkali metal carbonate containing not more than 1.5, preferably between 0.5 and 1.5, chemical equivalent of the carbonate per mole of the hydroxide.

(4) This reaction mixture should contain sufficient water to dissolve the formaldehyde and the alkali.

(5) The reaction may satisfactorily be carried out at temperatures between 50° and 85° C., but it occurs most rapidly and smoothly at temperatures between 70° and 80° C.

With regard to the above operating limitations, we have found that when the molecular ratio of formaldehyde to methyl ethyl ketone in the reaction mixture initially is appreciably greater than 1, e. g. 1.2 or greater, the reaction must be stopped far short of completion if excessive by-product formation is to be avoided. However, by employing 0.7 mole or less of formaldehyde per mole of methyl ethyl ketone, nearly all of the formaldehyde may be reacted to form the ketol in good yield without excessive by-product formation. We have further discovered that the employment of more than 0.01 chemical equivalent of alkali per mole of methyl ethyl ketone, or more than 0.03 chemical equivalent of alkali per mole of formaldehyde, usually results in excessive by-product formation. In practice, we preferably employ between 0.0015 and 0.008 chemical equivalent of alkali and between 0.2 and 0.7 mole of formaldehyde per mole of methyl ethyl ketone. The alkali and formaldehyde may, of course, be used in smaller proportions if desired.

Water is preferably present in amount sufficient so that the reaction mixture will dissolve the desired amount of formaldehyde. The mixture preferably contains less than 1.5 parts by weight of water per part of formaldehyde. Usually water is used in amount sufficient to form with the formaldehyde an aqueous formaldehyde solution of higher than 35 per cent by weight concentration.

As stated above, the alkali may be an alkali metal hydroxide, but is preferably a mixture of such hydroxide and an alkali metal carbonate, e.g. sodium, potassium, or lithium carbonate, since the reaction occurs most smoothly and with least by-product formation when using the mixture. Alkali metal carbonates alone do not satisfactorily promote the reaction.

In addition to the foregoing, it also is desirable that the time of reaction be limited, since we have observed that the desired reaction for the formation of methyl beta-hydroxy-isopropyl ketone may otherwise be followed by further reaction to form by-products, e.g. by destruction of the methyl beta-hydroxy-isopropyl ketone product. Such side reactions, as well as the desired principal reaction, are promoted by the presence of alkali. However, it is known that alkali is gradually neutralized or otherwise consumed during the reaction for the formation of methyl beta-hydroxy-isopropyl ketone. If all, or substantially all, of the alkali is consumed during this principal reaction to form the desired ketol product, there is little need for limiting the time over which the mixture is maintained at the reaction temperature, since the subsequent side reactions to form by-products at the expense of the desired ketol product then occur only sluggishly, or not at all. However, if, as is usually the case, the mixture remains somewhat alkaline after completion of the reaction to form the methyl beta-hydroxy-isopropyl ketone, the time over which the mixture is maintained under the conditions necessary for fairly rapid reaction should be limited so as to prevent, or inhibit, the subsequent side reactions. Although, as hereinafter explained, the time over which the reaction may satisfactorily be conducted is dependent to a large extent on the procedure used, and varies depending upon the procedure, it also is dependent upon the proportion of alkali present. As the proportion of alkali in the reaction mixture is increased it becomes more important that the time of reaction be restricted. The reactions which occur may be halted when desired either by cooling the mixture to a temperature below 50° C., preferably to room temperature or thereabout, or by treating the mixture with sufficient acid, e.g. hydrochloric acid, sulphuric acid, or acetic acid, etc., to neutralize the alkali therein. When the reaction has been halted by mere cooling of the mixture, it is advisable within a day or two thereafter also to neutralize the mixture, or to separate the methyl beta-hydroxy-isopropyl ketone product, since the side reactions do occur, though sluggishly, even at room temperature if alkali is present.

The reaction for the formation of methyl beta-hydroxy-isopropyl ketone may be carried out in batchwise manner, or continuously, as desired, if the reaction is carried out in batchwise manner, e.g. by heating a stationary body of the reaction mixture in an open or closed container, the reaction for formation of the ketol usually is substantially complete after from 2 to 45 minutes of heating. Longer heating is not necessarily detrimental. However, it is advisable to cool the mixture, or to neutralize any alkali remaining therein, within two hours after heating it to the reaction temperature.

When the reaction is carried out in continuous manner, e.g. by causing the mixture to flow through a heated reaction chamber, it is more important that the time of reaction be limited, since for some as yet unknown reason the principal reaction to form methyl beta-hydroxy-isopropyl ketone is more likely to be followed by fairly rapid side reactions when operating continuously than when operating batchwise. When operating in continuous manner, we limit the time of reaction to less than 20 minutes and preferably between 1 and 10 minutes, although longer reaction periods, e.g. up to 2 hours, may in some instances, particularly when operating at the lower reaction temperatures, e.g. at 50°–55° C., be permitted without excessive by-product formation.

The reaction may be carried out in batchwise manner by heating a mixture of formaldehyde, methyl ethyl ketone and the alkaline promoter in the proportions hereinbefore specified under reflux or in a closed reactor, e.g. an autoclave, to a reaction temperature between 50° and 85° C. The time of heating required for substantial completion of the reaction is of course dependent upon the temperature employed. By heating the mixture at temperatures between 70° and 85° C., the reaction to form methyl beta-hydroxy-isopropyl ketone may be completed in from 2 to 20 minutes. When the reaction is carried out at a lower temperature, e.g. 50° C., thirty minutes or more of heating may be required for completion of the reaction. As hereinbefore stated, when operating in batch maner, longer heating, e.g. up to 2 hours, does not cause excessive by-product formation. However, it is well to stop the reaction in less than 2 hours after starting it, since prolonged heating does result in increased by-product formation. The reaction may be halted by cooling the mixture to room temperature or thereabout, or by treating the mixture with sufficient acid, e.g. hydrochloric, sulphuric, or acetic acid, etc., to render the mixture neutral or slightly acid.

When methyl beta-hydroxy-isopropyl ketone is to be produced commercially, the reaction is preferably carried out in continuous manner by passing the reaction mixture through a reaction zone, wherein it is heated to a temperature between 50° and 85° C. and either cooling or acidifying the mixture as it issues from said zone. The rate of flow is preferably sufficient so that the time of reaction will not exceed 20 minutes. When operating at temperatures between 70° and 85° C., the time of reaction is advantageously limited to between 1 and 10 minutes.

The methyl beta-hydroxy-isopropyl ketone product may be separated from the reacted mixture in any of the usual ways, e.g. by fractional distillation.

The following examples described a number of ways in which the principle of the invention has been applied, but are not to be construed as limiting the invention.

*Example 1*

The purpose of this example is to show the results obtained when operating under reaction conditions which, in certain respects, are just within the limits of the conditions required by the invention. More specifically, the example shows the results obtained by carrying the reaction out in batchwise manner, using sodium hydroxide alone as the alkaline promoter and employing formaldehyde and methyl ethyl ketone in approximately equimolecular proportions. A mixture of 635 grams (8.82 moles) of methyl ethyl ketone, 720 grams of a 37 per cent concentrated aqueous formaldehyde solution (containing 8.87 moles of formaldehyde and a small amount of dissolved methanol as a stabilizer for the formaldehyde), and 26 grams of a 2 normal aqueous sodium hydroxide solution (containing approximately 0.013 mole of sodium hydroxide) was heated at a temperature of 75° C. for 1 hour, after which the mixture was permitted to stand over night with gradual cooling to room temperature. The mixture was then acidified with 1 cc. of glacial acetic acid and fractionally distilled to separate the products. There were obtained 108 grams (1.5 moles) of unreacted methyl ethyl ketone and 490 grams (4.8 moles) of methyl beta-hydroxy-isopropyl ketone. The yield of the latter was 54.4 per cent of theoretical, based on the methyl ethyl ketone employed or 65 per cent, based on the methyl ethyl ketone consumed.

*Example 2*

A mixture of 953 grams (13.2 moles) of methyl ethyl ketone, 718 grams of a 36.4 per cent concentrated aqueous formaldehyde solution (containing 8.7 moles of formaldehyde and a small amount of methanol), 7.5 grams of a 2 normal aqueous sodium hydroxide solution and 7.5 grams of a 2 normal aqueous sodium carbonate solution was heated from room temperature to 55° C. in 20 minutes and was maintained at temperatures between 55° and 60° C. for 1 hour and 55 minutes. During this period of reaction small equimolecular portions of sodium hydroxide and sodium carbonate were added from time to time, as 2 normal aqueous solutions thereof, in the amounts necessary to maintain the mixture slightly alkaline. A total of 0.025 mole of sodium hydroxide and 0.025 chemical equivalent of sodium carbonate was used in carrying out the reaction. At the close of the reaction period just stated, the mixture was acidified with glacial acetic acid and fractionally distilled. There were obtained 572 grams (7.95 moles) of unreacted methyl ethyl ketone and 497 grams (4.87 moles) of methyl beta-hydroxy-isopropyl ketone. The yield of the latter was 92.8 per cent of theoretical, based on the methyl ethyl ketone consumed.

*Example 3*

A mixture of 953 grams (13.2 moles) of methyl ethyl ketone, 718 grams of a 36.4 per cent concentrated aqueous formaldehyde solution (containing 8.7 moles of formaldehyde and a small amount of methanol), 7.5 grams of a 2 normal aqueous sodium hydroxide solution (containing approximately 0.015 chemical equivalent of sodium hydroxide), and 7.5 grams of a 2 normal sodium carbonate solution (containing about 0.015 chemical equivalent of sodium carbonate) was heated from room temperature to 75° C. in 16 minutes and was maintained at temperatures between 75° and 81° C. for 5 minutes. It was then acidified with acetic acid and fractionally distilled. There were obtained 556.8 grams (7.73 moles) of unreacted methyl ethyl ketone and 528.5 grams (5.18 moles) of methyl beta-hydroxy-isopropyl ketone. The yield of the latter was 94.9 per cent of theoretical, based on the methyl ethyl ketone consumed.

*Example 4*

A mixture of 42.9 parts by weight of a 36.5 per cent concentrated aqueous formaldehyde solution (containing 0.522 molecular equivalent of formaldehyde), 57.1 parts (0.793 molecular equivalent) of methyl ethyl ketone, and 1.365 parts of a 4 normal aqueous solution of sodium hydroxide and sodium carbonate in chemically equivalent proportions (which aqueous alkali solution contained 0.0027 chemical equivalent of sodium hydroxide and 0.0027 chemical equivalent of sodium carbonate), and about 5 parts of methanol was passed through a heated tubular reactor of 6760 cubic centimeter capacity at a rate of 300 pounds per hour, said rate being such that the contact time, i. e. the time required for an integral portion of the mixture to pass through the reactor, was about 3 minutes. While passing through the reactor, the mixture was heated to a temperature between 80° and 83° C. The mixture was treated as it flowed from the reactor with sufficient acetic acid to neutralize the alkali therein. The reacted mixture contained 32.55 parts of unreacted methyl ethyl ketone and 31.4 parts of methyl beta-hydroxy-isopropyl ketone. The yield of the latter was 90.2 per cent of theoretical, based on the methyl ethyl ketone consumed. Approximately 91 per cent of the formaldehyde employed was consumed in the reaction.

This application is a continuation-in-part of our co-pending application, Serial No. 364,872, filed November 8, 1940, and now abandoned.

Other modes of applying the principle of the invention may be employed instead of those explained, change being made as regards the method herein disclosed, provided the step or steps stated by any of the following claims or the equivalent of such stated step or steps be employed.

We therefore particularly point out and distinctly claim as our invention:

1. In a method of making methyl beta-hydroxy-isopropyl ketone, the steps which consist in heating to a reaction temperature between 75° and 85° C. for not more than 2 hours a mixture comprising methyl ethyl ketone, an aqueous formaldehyde solution of at least 30 per cent concentration, sodium hydroxide, and sodium carbonate, which mixture contains between 0.0015 and 0.008 chemical equivalent of alkali and between 0.2 and 0.7 molecular equivalent of formaldehyde per mole of methyl ethyl ketone and between 0.5 and 1.5 chemical equivalent of the sodium carbonate per mole of sodium hydroxide, and thereafter treating the mixture with sufficient acid to neutralize the alkali and separating the methyl beta-hydroxy-isopropyl ketone product.

2. A continuous method for the production of methyl beta-hydroxy-isopropyl ketone which comprises passing a mixture comprising methyl ethyl ketone, an aqueous formaldehyde solution of at least 30 per cent concentration, an alkali metal hydroxide and an alkali metal carbonate, which mixture contains between 0.0015 and 0.008 chemical equivalent of alkali and between 0.2 and 0.7 molecular equivalent of formaldehyde per mole of methyl ethyl ketone and between 0.5 and 1.5 chemical equivalent of the alkali metal carbonate per mole of alkali metal hydroxide, through a reaction zone wherein it is heated to temperatures between 75° and 85° C. for between 1 and 20 minutes, treating the mixture as it flows from said zone with sufficient acid to neutralize the alkali, and thereafter separating the methyl beta-hydroxy-isopropyl ketone product.

3. In a continuous method for the production of methyl beta-hydroxy-isopropyl ketone, the steps which consist in passing a mixture comprising methyl ethyl ketone, an aqueous formaldehyde solution of at least 30 per cent concentration, sodium hydroxide and sodium carbonate, which mixture contains between 0.0015 and 0.008 chemical equivalent of alkali and between 0.2 and 0.7 molecular equivalent of formaldehyde per mole of methyl ethyl ketone and between 0.5 and 1.5 chemical equivalent of sodium carbonate per mole of sodium hydroxide, through a reaction zone wherein it is heated to temperatures between 75° and 85° C. for between 1 and 10 minutes, treating the mixture as it flows from said zone with sufficient acetic acid to neutralize the alkali, and thereafter separating the methyl beta-hydroxy-isopropyl ketone product.

ROBERT R. DREISBACH.
GEORGE BEAL HEUSTED.

REFERENCES CITED

The following references are of record in the file of this patent:

UNITED STATES PATENTS

| Number | Name | Date |
|---|---|---|
| 981,668 | Merling | Jan. 17, 1911 |
| 2,064,564 | Quattlebaum | Dec. 15, 1936 |

OTHER REFERENCES

Morgan, "Chemistry and Industry," 1938, pages 885–891.